(12) United States Patent
Valette

(10) Patent No.: US 10,946,477 B2
(45) Date of Patent: Mar. 16, 2021

(54) SYSTEM AND METHODS FOR GENERATING LASER MARKINGS ON METALLISED SUBSTRATES

(71) Applicant: DOVER EUROPE SARL, Vernier (CH)

(72) Inventor: Stephane Valette, Etoile-sur-Rhone (FR)

(73) Assignee: Dover Europe Sarl, Vernier (CH)

( * ) Notice: Subject to any disclaimer, the term of this patent is extended or adjusted under 35 U.S.C. 154(b) by 172 days.

(21) Appl. No.: 16/093,556

(22) PCT Filed: Apr. 26, 2017

(86) PCT No.: PCT/EP2017/059929
§ 371 (c)(1),
(2) Date: Oct. 12, 2018

(87) PCT Pub. No.: WO2017/207179
PCT Pub. Date: Dec. 7, 2017

(65) Prior Publication Data
US 2019/0134743 A1    May 9, 2019

Related U.S. Application Data

(60) Provisional application No. 62/345,711, filed on Jun. 3, 2016.

(51) Int. Cl.
*B23K 26/06* (2014.01)
*B23K 26/00* (2014.01)
(Continued)

(52) U.S. Cl.
CPC ...... *B23K 26/0643* (2013.01); *B23K 26/0006* (2013.01); *B23K 26/064* (2015.10);
(Continued)

(58) Field of Classification Search
CPC .. B23K 26/0643; B23K 26/064; B23K 26/57; B23K 26/0006; B23K 2101/34; B23K 2103/40
(Continued)

(56) References Cited

U.S. PATENT DOCUMENTS 4,270,335 A * 6/1981 Dardaine ............... B65B 61/26
53/131.2
7,394,479 B2  7/2008 Assa et al.
(Continued)

FOREIGN PATENT DOCUMENTS

CN    1100377 A    3/1995
CN    1946568 A    4/2007
(Continued)

OTHER PUBLICATIONS

International Search Report/Written Opinion, dated Aug. 9, 2017 by European ISA, 14 pages.
(Continued)

*Primary Examiner* — Phuong T Nguyen
(74) *Attorney, Agent, or Firm* — Fish & Richardson P.C.

(57) ABSTRACT

The present disclosure includes systems and method relating to laser marking, in particular an apparatus comprises a fiber laser operable to produce a laser beam, an optics assembly operable to focus and direct the laser beam onto a non-metalized layer side of a substrate, wherein the substrate comprises the non-metalized layer side comprising a non-metalized material and a metalized layer side comprising a metalized material, the metalized layer side being opposite the non-metalized layer side; and electronics communicatively coupled with the fiber laser and the optics assembly, the electronics being operable to control the fiber laser and the optics assembly, based on one or more laser settings, to direct the laser beam through the non-metalized layer side to (Continued)

be absorbed by the metalized layer side, generate a laser marking on the metalized material, and avoid generating the laser marking on the non-metalized material.

12 Claims, 5 Drawing Sheets

(51) Int. Cl.
| | |
|---|---|
| *B41M 5/24* | (2006.01) |
| *B41M 5/26* | (2006.01) |
| *B23K 26/57* | (2014.01) |
| *B23K 26/064* | (2014.01) |
| *B23K 103/00* | (2006.01) |
| *B23K 101/34* | (2006.01) |

(52) U.S. Cl.
CPC ............. *B23K 26/57* (2015.10); *B41M 5/24* (2013.01); *B41M 5/26* (2013.01); *B23K 2101/34* (2018.08); *B23K 2103/40* (2018.08)

(58) Field of Classification Search
USPC ........................................ 219/121.67, 121.66
See application file for complete search history.

(56) References Cited

U.S. PATENT DOCUMENTS

| | | | | |
|---|---|---|---|---|
| 8,400,673 | B2* | 3/2013 | Depta | B42D 25/324 |
| | | | | 358/1.7 |
| 8,628,898 | B2* | 1/2014 | Kawahara | B41J 2/4753 |
| | | | | 430/19 |
| 8,854,411 | B2 | 10/2014 | Yohn et al. | |
| 8,875,628 | B2* | 11/2014 | Depta | B41J 2/471 |
| | | | | 101/170 |
| 9,505,254 | B2* | 11/2016 | Jarvis | B41M 5/3375 |
| 9,636,776 | B2* | 5/2017 | Dallarosa | B23K 26/362 |
| 9,835,943 | B2* | 12/2017 | Quenzer | B44F 1/08 |
| 2005/0255406 | A1 | 11/2005 | Assa | |
| 2008/0088859 | A1* | 4/2008 | Depta | B42D 25/324 |
| | | | | 358/1.7 |
| 2008/0153698 | A1* | 6/2008 | Kawahara | B41M 5/26 |
| | | | | 503/201 |
| 2008/0250954 | A1* | 10/2008 | Depta | B41J 2/442 |
| | | | | 101/170 |
| 2011/0267416 | A1 | 11/2011 | Yohn et al. | |
| 2014/0342903 | A1* | 11/2014 | Jarvis | B41M 5/284 |
| | | | | 503/201 |
| 2015/0009272 | A1 | 1/2015 | Yohn et al. | |
| 2015/0225891 | A1 | 8/2015 | Clowes | |
| 2015/0336215 | A1* | 11/2015 | Quenzer | B41M 5/28 |
| | | | | 428/204 |
| 2016/0067996 | A1* | 3/2016 | Xu | C04B 41/009 |
| | | | | 428/201 |

FOREIGN PATENT DOCUMENTS

| | | |
|---|---|---|
| CN | 101564947 A | 10/2009 |
| CN | 102985263 A | 3/2013 |
| CN | 103958624 A | 7/2014 |
| DE | 19822605 | 11/1999 |
| EP | 3256391 A1 | 12/2017 |
| EP | 3486183 A1 | 5/2019 |
| JP | 2014154661 A | 8/2014 |

OTHER PUBLICATIONS

International Preliminary Report on Patentability, dated Jul. 30, 2018 by European ISA, 15 pages.
Chinese Application No. 201780033358.6, Notification of the First Office Action, dated May 7, 2020, 12 pages, with translation.
"Fiber laser", Wikipedia, the free encyclopedia, https://en.wikipedia.org/wiki/Fiber_laser, Feb. 24, 2016, 5 pages.

* cited by examiner

SYSTEM AND METHODS FOR GENERATING LASER MARKINGS ON METALLISED SUBSTRATES

CROSS REFERENCE TO RELATED APPLICATIONS

This application is a National Stage Application under 35 U.S.C. § 371 and claims the benefit of International Application No. PCT/EP2017/059929, filed Apr. 26, 2017 that claims priority to U.S. Provisional Application No. 62/345,711 filed Jun. 3, 2016.

BACKGROUND

The present application describes systems and techniques relating to laser marking, for example, laser-based systems for marking codes on products.

Laser printing systems have been used to mark various types of surfaces. For example, laser printing has been used to mark codes on commercially available products. Such codes often include information corresponding to the time and place of product manufacture (e.g., a batch number). Typical types of codes marked on products include alphanumeric codes and machine readable codes. When products are marked as part of a manufacturing or packaging process, increasing the speed of marking and decreasing the costs of the printing system facilitate optimization of the manufacturing or packaging process.

SUMMARY

The present disclosure includes systems and techniques relating to laser marking. According to an aspect, an apparatus includes: a fiber laser operable to produce a laser beam; an optics assembly operable to focus and direct the laser beam onto a non-metalized layer side of a substrate, wherein the substrate comprises the non-metalized layer side comprising a non-metalized material and a metalized layer side comprising a metalized material, the metalized layer side being opposite the non-metalized layer side; and electronics communicatively coupled with the fiber laser and the optics assembly, the electronics being operable to control the fiber laser and the optics assembly, based on one or more laser settings, to direct the laser beam through the non-metalized layer side to be absorbed by the metalized layer side, generate a laser marking on the metalized material, and avoid generating the laser marking on the non-metalized material.

According to another aspect, a system includes: a laser operable to produce a laser beam having a wavelength of 1.06 μm; an optics assembly operable to focus and direct the laser beam onto a paper layer side of substrate comprising the paper layer side and a foil layer side opposite the paper layer side; and electronics communicatively coupled with the laser and the optics assembly, the electronics being operable to control the laser and the optics assembly, based on one or more laser settings, to direct the laser beam through the paper layer side to generate a laser marking on the foil layer side.

An aspect relates to a method for laser marking a packaging substrate with a laser beam, wherein the method includes: receiving one or more laser settings, wherein the one or more laser settings are determined to configure a laser to produce a laser beam having a wavelength of 1.06 μm that is absorbed by a foil layer side of a substrate and substantially not absorbed by a paper layer side of the substrate, wherein the substrate comprises the foil layer side and the paper layer side opposite the foil layer side; and directing, based on the one or more laser settings, a laser beam through the paper layer side to generate a laser marking on the foil layer side and avoid generating the laser marking on the paper layer side using the laser beam.

One or more of the following advantages may be provided. The systems and techniques described can produce a laser marking on a packaging substrate that does not affect the marketing look and feel of the product. The size, arrangement, and location of the laser marking can provide a discreet code that reduces the code's visibility to a consumer. The laser marking techniques described can produce an indelible and traceable code (e.g., anti-counterfeiting) on the packaging substrate with an increased resistance to tampering (e.g., being removed or visibly compromised) over typical ink based printed codes. The quality of the product code produced using laser marking techniques can be increased over typical ink based printing techniques. The system and techniques can include producing a laser marking in a determined marking area of the packaging substrate, which can achieve the benefits of preventing the laser marking from coming into direct contact with a food product that a product package contains. Moreover, the system and techniques can provide compact laser marking components for ease of integration into packaging machinery. No chemicals related to typical ink based printing or laser sensitive chemistry need be employed in the laser marking techniques, thereby decreasing the potential of possible contamination of packaged food products. Further, better total cost of ownership and increased robustness of the laser tool can be achieved by employing a fiber laser in the systems and techniques described. Less machinery can be required to perform laser marking in a product line, and overall efficiency can be improved.

Details of one or more implementations are set forth in the accompanying drawings and the description below. Other features and advantages may be apparent from the description and drawings, and from the claims.

BRIEF DESCRIPTION OF THE DRAWINGS

Like reference symbols in the various drawings indicate like elements.

DETAILED DESCRIPTION

Figure 1:
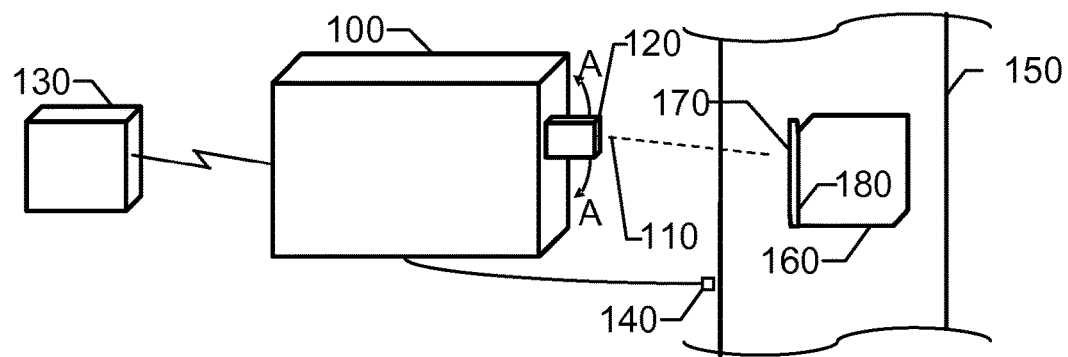
FIG. 1 is a top, perspective view of a laser marking system.

FIG. 1 is a top, perspective view of a laser marking system. The system includes a laser marking device 100 that generates a laser beam 110. The laser marking device 100 can be implemented as a fiber laser. Lasers producing near infrared (IR) wavelengths, such as fiber lasers, can be used for marking materials, both metals and nonmetals. The laser marking device 100 is employed to generate a laser beam 110. The laser beam 110 is directed through a series of moves between predefined locations on a packaging substrate 170 so as to generate a laser marking that is visible to the unaided human eye on a metalized layer of the substrate 170.

The packaging substrate 170 can be used as a packaging material to seal a product 160. The product 160 can be a food product such as yogurt, for instance, that can be vulnerable to debris and contaminates in a manner that necessitates the product 160 to be covered using packaging substrate 170. In the embodiments, the packaging substrate 170 includes two sides, and each side is composed of a distinct material, respectively. The packaging substrate 170 has a top, or otherwise outer, side that is a layer made of paper or other non-metalized material, such as plastic. Additionally, the bottom, or underside, portion of the packaging substrate 170 is a layer containing a metalized material, such as aluminum foil. The laser marking device 100 employs laser beam 110 to indelibly generate a laser marking on the bottom foil layer side 180, while not marking, or invisibly marking, the top layer side. Spots can be generated by the laser beam 110, for example, that are arranged to form a laser marking on the foil layer side 180 of the packaging substrate 170.

A laser marking is formed on the foil layer side 180 of packaging substrate 170 by employing a fiber laser component of the laser marking device 100 for altering a visible, optical characteristic of metalized material of the packaging substrate 170. The laser marking device 100 is particularly configured to produce a laser beam 110 where the emitted light travels through the non-metal layer side of the packaging substrate 170 to be absorbed, or otherwise mark, the foil layer side 180 of the packaging substrate 170. The laser beam 110 can alter a variety of optical characteristics. For instance, a fiber laser can produce laser beam 110 at a near infrared (IR) wavelength that can be absorbed well by metals, for example aluminum foil. Therefore, at the location where the laser beam 110 is absorbed by the metalized bottom layer of the packaging substrate 170, a mark is formed that is visible to the naked human eye. In some embodiments, the laser beam 110 causes areas of an inner foil of the packaging substrate 170 to become ablated using localized heating of the metal, for example aluminum, contained in the bottom layer of the substrate. Additionally, in some embodiments, the laser marking can be produced on the foil layer side 180 using other various marking techniques achievable using fiber lasers, for example, including but not limited to: annealing, frothing, color changing, engraving, etching, and the like. The laser marking can include printed information, such as a serialized code that is visible on the bottom of the packaging substrate 170 since the human eye can pick up the sections having darker, engraved, or removed areas.

The predefined locations of packaging substrate 170 for directing the laser beam 110 can be arranged such that the spots form multiple symbols of the laser marking, such as numerical and alphabetic characters. The predefined locations can be arranged such that the spots form multiple pixels, and the pixels in turn form the one or more symbols. Further, in some implementations, the predefined locations can create vector graphics for smooth alphanumeric symbols, icons, logos, or combinations of these. Because the laser marking system 100 employs a laser in order to mark the product 160, for example, there is no need for consumables such as inks and solvents that can be typically used in Continuous Ink Jet (CIJ) or Large Character Ink Jet (LCIJ) product printing technology. Moreover, without the use of ink, the laser marking system 100 of the embodiments does not introduce chemicals associated with ink that can be a contamination risk, and thereby may impact the quality of a food product 160, for example. Accordingly, the laser marking system can reduce the costs and complexity associated with printing information on various products. Furthermore, the laser marking system 100 may decrease pollution risks that can be experienced by products in ink-based printing techniques.

The product 160 for use with the laser marking system can be products to be sold retail or products sold to businesses. In the implementations, examples of a product 160 can include foods that use metalized material, such as foil, for sealing and packaging, for example dairy products like yogurt. Furthermore, the laser marking devices and techniques described may be employed for products in industries other than food packaging such as pharmaceuticals, pharmaceutical packaging, cosmetics, computer components, automotive components, medical devices, detergents and beverages such as soft drinks and wines. Moreover, the laser marking can be formed in multiple locations on a product 160 and can include both code information and image information.

The system includes electronics 130 that operate the laser marking device 100. These electronics can include analog and digital electronic circuitry, such as one or more application specific integrated circuits (ASICs), as well as programmable electronics, such as one or more programmable processors, and one or more memory devices. These electronics are included in the laser marking device 100, but can also be included in one or more additional devices making up the laser marking system. For example, a device 130 can be communicatively coupled (by wire or wireless link) with the laser marking device 100. The device 130 can be an electronic user interface device designed specifically for the laser marking device 100, a general purpose computer programmed with user interface software, or a combination of these.

The user interface can be remote from the laser marking device 100, attached to the laser marking device 100, and/or detachable from the laser marking device 100. A suitable user interface can include an alphanumeric keyboard and a display. The user interface can be used to program the electronics and/or set marking parameters. For instance, the user interface can be used to control a dwell time that the laser beam 110 stays at a location on the packaging substrate 170 to form a spot, the size of any pixels used to form a symbol, and the type and sequence of symbols that are formed. The user interface can also be used to manually activate the laser marking system. For instance, the user interface can include a key that causes the laser marking device 100 to mark the packaging substrate 170.

Additionally, in some implementations, the user interface can be employed to receive particular settings for a laser marking device 100 configuration used to implement laser marking in accordance with the embodiments. For example, a user interface provided by device 130 can receive one or more parameters associated with a specific configuration for a laser component of the laser marking device 100. Subsequently, laser marking device 100 set in a manner corresponding to the received parameters can produce a laser beam 110 at a wavelength that can be optimal for effectively passing through the paper layer of packaging substrate 170, while being absorbed by the foil layer underneath. In some embodiments, the settings for the laser configuration, including a wavelength of the resultant laser beam, can be determined based on various considerations for the system. Such consideration can involve determining a desired laser beam behavior, marking requirements, product requirements, constraints for packaging machine integration, absorption rates, and materials used in the packaging substrate, for example.

The laser marking system can be used to mark a laser marking, or codes on product 160 while it is moving, where there is a limited amount of time available for printing on each product that can be packaged using packaging equipment. The laser marking system can include electronics for varying the amount of time required to mark the codes on the product 160. For example, the laser marking system can include electronics for changing the density of pixels in the codes to be formed, such as by changing the density of individual pixels that define an alpha-numeric code or changing the number of pixels making up an image. Symbols in the codes having a reduced pixel density can be printed more quickly than symbols with an increased pixel density. Furthermore, the laser marking system can include electronics for changing the size of the pixels. Smaller pixels require less marking time. The ability to change the time required to mark a laser marking allows the printing system to be used in conjunction with an increased number of production lines.

The electronics included in device 130 can operate the laser marking device 100 to also be in communication with one or more sensors 140. These sensors can provide the electronics with information about the products on which the laser marking system is to mark. For instance, the sensors 140 can indicate the location of product 160 relative to the laser marking system, the direction that a product is moving and when a moving product has been stopped and when a product is in the correct position to be printed upon. Packaging machinery, for example, a Forming Filling & Sealing (FFS) packaging device can typically have a stop time of 1000-1200 ms. According to an embodiment which integrates laser marking capabilities into packaging machinery, a sensor 140 can be employed to detect the movement and position of a product 160 in relation to a stop time of the packaging machinery. Suitable sensors 140 include, but are not limited to, a speed sensor for detecting the speed and/or direction that a product 160 is moving, and a location sensor for indicating when a product is positioned in front of the sensor.

In some implementations, components of the laser marking system can be integrated into packaging equipment and devices, thus including laser marking operations as part of a product line and/or packaging process. For instance, a web roll can be employed by packaging machines in order to cover the product 160 with packaging substrate 170, and thereby creating a metalized barrier for sealing product 160. In some implementations, the laser marking system produces laser markings on the foil layer side 180 of the packaging substrate 170 prior to being placed on product 160. For instance, the packaging substrate 170 can be laser marked while on the web roll. Alternatively, laser marking can be performed after sealing, or otherwise packaging, the product 160 using substrate 170. Laser marking system can perform laser marking on a moving product or a stationary product. A conveyor belt 150 can be employed by packaging machinery as a moving mechanism for transporting products during the packaging process. The conveyor belt 150 can temporarily stop a product line, thereby stopping product 160 in front of the laser marking device 100. A sensor 140 can be a device that triggers the marking (e.g., a device that produces a laser beam, which is disrupted by the product) either immediately or after a time delay. When the laser marking system operates on a moving product, such as products on conveyor belt 150, the electronics can use signals from a speed sensor 140 to determine the speed and direction of the product 160 on the product line. Suitable speed sensors include, but are not limited to, encoders and resolvers. The laser marking system can determine the speed of the product 160 on the line and use this speed to determine a laser marking position time delay. The laser marking position time delay is determined such that the code is marked at a desired position on the product 160. The codes are then marked onto product 160, as it moves past the laser marking device 100 based on the determined laser marking position time delay. Additionally, the laser marking system can determine the speed of a next product while marking on a current product.

When setting up the laser marking system, the focal distance that is the distance between the laser marking device 100 and the product 160 and/or the sensor 140 can be administratively entered into the electronics with the user interface. For example, focal distance can be entered as a setting for configuring the laser marking device 100. In some implementations, the sensor 140 can be attached to the laser marking device 100 so as to provide a fixed and known distance between the sensor 140 and the laser beam 110, which can correspond to the particular focal distance. In this latter embodiment, the focal distance can be preprogrammed into the electronics in the system and does not need to be administratively entered.

The laser marking device 100 can include a laser beam exit member 120 through which the laser beam 110 exits a housing of laser marking device 100. In some implementations, a housing for the laser marking device 100 includes a fiber laser head. Accordingly, the laser beam exit member 120 can be implemented as an appropriate mechanism for emitting an optically pumped laser beam as output from the laser head, such as an optical fiber or flat field focusing lens, for example. Alternatively, the laser beam exit member 120 can include an opening in a larger unit, such as a safety enclosure for the laser, or an immobile window mounted in a housing for the laser marking device 100. In another embodiment, the laser beam exit member 120 can be moved relative to the housing as illustrated by the arrows labeled A. In this embodiment, the laser beam exit member 120 can be rotatably moved (e.g., manually or automatically adjusted) through a continuous set of multiple directional positions to point the laser beam 110 toward a particular position on the packaging substrate 170. In some embodiments, automatic positioning mechanisms, such as galvanometer motors and scanning mirrors, can be employed to direct and/or focus a generated laser beam from laser beam exit member 120. Thus, manipulating the laser beam exit member 120 allows the laser beam 110 to be readily aimed, after the laser marking device 100 has been installed.

Figure 2:
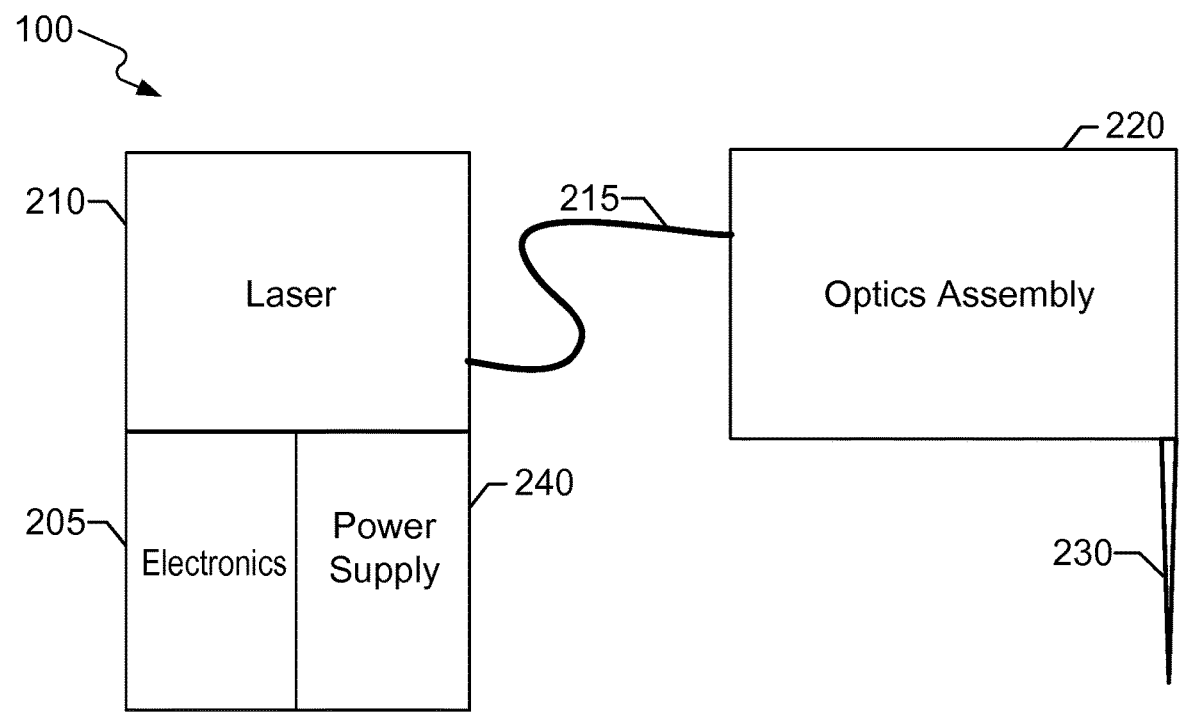
FIG. 2 is a block diagram illustrating components of a laser marking device.

FIG. 2 illustrates components of the laser marking device 100. The laser marking device 100 includes a laser 210. A laser 210 generates the laser light that is emitted as laser beam 230 employed for producing a laser marking on a metalized layer of a packaging substrate. Laser 210 can be implemented as a fiber laser that is configurable to generate a laser beam 230 at wavelengths that may experience high absorption in various metal materials and low to negligible absorption by other non-metal materials, such as paper. A fiber laser implementation for laser 210 can be employed to generate a laser beam 230 at an appropriate wavelength for producing laser markings on thinner (e.g., less than 1 mm) metal materials, such as foil. For example, laser 210 is configured to generate a laser beam 230 of wavelength 1.06 µm which can be optimal for performing laser marking on an inner foil of a packaging substrate, according to the embodiments. Thus, laser 210 may be advantageous for use with packaging metals in contrast to other laser technologies that are directed to generating beams at larger wavelength. For instance, $CO_2$ lasers can operate at a 10.6 μm wavelength that may be better applied to cutting thicker metal materials (e.g., above 5 mm). Moreover, absorption of $CO_2$ laser output can be poor on some metals, and consequently may not effectively produce a visible mark on a foil layer without further employing dedicated laser sensitive chemistry in the substrate. Thus $CO_2$ laser technology requiring such laser sensitive chemistry may not be acceptable for product marking purposes due to some food packaging regulations, as chemical handling may not be permitted in food packaging. Thus, it can be appreciated that a fiber laser implementation realizes various advantages with respect to other laser mechanisms. In some implementations, the laser 210 is not necessarily a fiber laser, and therefore can be designed using any laser deemed suitable for producing a laser beam 230 at the desired wavelength (e.g., 1.06 μm) for the packaging substrate.

Fiber lasers employ fiber pumping technologies that involve using a part of the fiber itself, as the resonator cavity for the laser. In the embodiment, laser 210 is designed to use optical fibers doped with earth-halides (e.g., such as ytterbium or erbium) as the active medium for conducting laser light received from a source. The resonator for laser 210 can include a fiber bundle that is pumped with a light emitting source module. Therefore, laser 210 can include a laser source that is employed to create, and subsequently pump, laser light into the fiber optic components of laser 210. Fiber lasers can be optically pumped with diodes, for instance a single diode, a bank of diodes, or a diode array. In some implementations, laser 210 can include a diode laser pump for generating the light source. Alternatively, in some implementations, other fiber lasers can be used as the pumping source. The laser 210 can be a fiber-coupled system where components are fiber-coupled to other respective components. Moreover, laser 210 can be implemented using internal fiber-coupling, bulk optics, or a combination thereof. In some implementations, the laser 210 is a continuous wave fiber laser. Alternatively, the laser can be a pulse fiber laser.

The laser marking device 100 includes optics assembly 220. Light that has traversed a fiber, for example a fiber cable, can be collimated or straightened by optics assembly 220 to generate a laser beam 230. The optics assembly 220, in some embodiments, is implemented within a laser head component (shown in FIG. 3). Furthermore, the optics assembly, as contained within the laser head, can include, but is not limited to: a beam expander for amplification, or expansion, of received laser light; dedicated collimating optics; optical isolators for preventing back reflection of a laser beam; and focusing optics for directing a laser beam 230. With the use of fiber optic components, the optics assembly 220 employs glass fibers using total internal reflection (TIR) to pass and aim light, instead of mirroring optics and moving components in the manner employed by $CO_2$ lasers, for instance. Consequently, a fiber laser implementation for laser 210 may realize a more robust and longer lasting laser tool that can experience a mean time between failures (MTBF) of 90,000 hours, for example.

In some implementations, the optics assembly 220 can include a lens to implement the focusing optics to focus laser beam 230 onto a material for marking, for example a packaging substrate. The optics assembly 220 can operate to aim and/or steer the laser beam 230 from one location to another location on the packaging substrate. In some implementations, the optics assembly 220 includes components for altering the direction of the laser beam 230, such as motorized actuators. These components can be controlled to direct the laser beam 230 from one location to another location in a non-raster scanning pattern (i.e., a scanning pattern other than one of parallel lines) so as to create a spot at each of the locations.

As shown in FIG. 2, laser 210 is coupled to the optics assembly 220 using cable 215. In some embodiments, the cable 215 is constructed with optical fibers. Accordingly, a fiber optic cable 215 can be used to guide, or otherwise deliver, light pumped from a source of laser 210 to arrive at the optics assembly 220. The cable 215 is attached to the laser 210, and subsequently channels the light to the opposite end of the cable 215 that can be coupled to the beam collimator and isolator of the optics assembly 220. In some embodiments, pump couplers can be employed to connect the laser source to the fiber of cable 215.

Electronics 205 are in communication with the laser 210 and the optics assembly 220. The electronics 205 can control the operation of the laser 210 and the optics assembly 220. According to the embodiments, an optimizing configuration for the laser marking device 100 can be particularly implemented to adjust the device, in order to perform the described metalized layer side marking capabilities of the embodiments. The configuration can include one or more parameters related to operational settings of laser marking device 100 components that are needed to produce a laser beam 230 with optimal characteristics, such as a desired wavelength (e.g., 1.06 μm), to be absorbed by metal material of the packaging substrate, for example a foil layer. Thus, the electronics can control the laser 210 (including the fiber laser), the optics assembly 220, and the power supply 240 components to operate in a manner consistent with the specified configuration. In some embodiments, a configuration used to optimize the laser marking device 100 can include specified parameters indicating the functional settings for power, frequency, marking speed, focal distance, and resolution. For example, a configuration for optimizing laser marking device 100 for marking a paper layer/foil layer packaging substrate includes: a laser power setting between 30% and 60%; a frequency setting between 25 KHz and 50 KHz; a marking speed setting of approximately 4,800 mm/s; a focal distance setting between 160 mm-480 mm; and a resolution setting at 10 pts/mm. In some embodiments, the laser marking device can use a configuration that includes each of the settings, or any suitable combination of the settings, as described above. Additionally, the parameters for the configuration can be predetermined, or dynamically adjustable, based on tailoring the laser marking device 100 configuration for operation according to material characteristics included in the packaging substrate, for example absorption rates.

The electronics 205 can control the optics assembly 220 to adjust the direction of the laser beam 230, the length of time that the laser beam 230 remains at a location on the material where a spot is to be formed, the speed that the laser beam 230 moves between locations where the beam dwells, the size of pixels used to create symbols of the laser markings, and the selection of symbols created. Moreover, the electronics 205 control the laser 210 to generate power pulses of the laser beam 230 in synchronization with the moves of the laser beam 230 between locations where the beam dwells. The dwell time used and the power profile of the laser beam 230 generated can be adjusted based in part on the nature of the material to be marked.

The laser marking device 100 can include a continuously variable power supply 240. The electronics 205 can control the continuously variable power supply to adjust a power output level of the laser 210. For example, the power supply 240, which powers the laser 210, can be run from between 20 W and 60 W, for example. Additionally, in some implementations, the laser 210 can operate between 10 W and 100 W. Increasing the power output level of laser 210 can correspondingly increase a width, for example, of the marking surface of a substrate that can be covered by a laser marking device 100. Thus, implementing lasers 210 powered at an increased wattage, and thereby increasing the associated marking surface area, can decrease the number of laser marking devices 100 needed to mark multiple and/or large areas (e.g., wide packaging substrates). The laser 210 can be run in a continuous-wave mode. In some embodiments, the laser 210 can be run in a pulse mode. Moreover, a pulse peak power can be adjusted, at least in part, by controlling the variable power supply 240. The pulse width can also be adjusted, and both pulse width and power supply can be adjusted in order to tune the power and the fluency with the moves.

Figure 3:
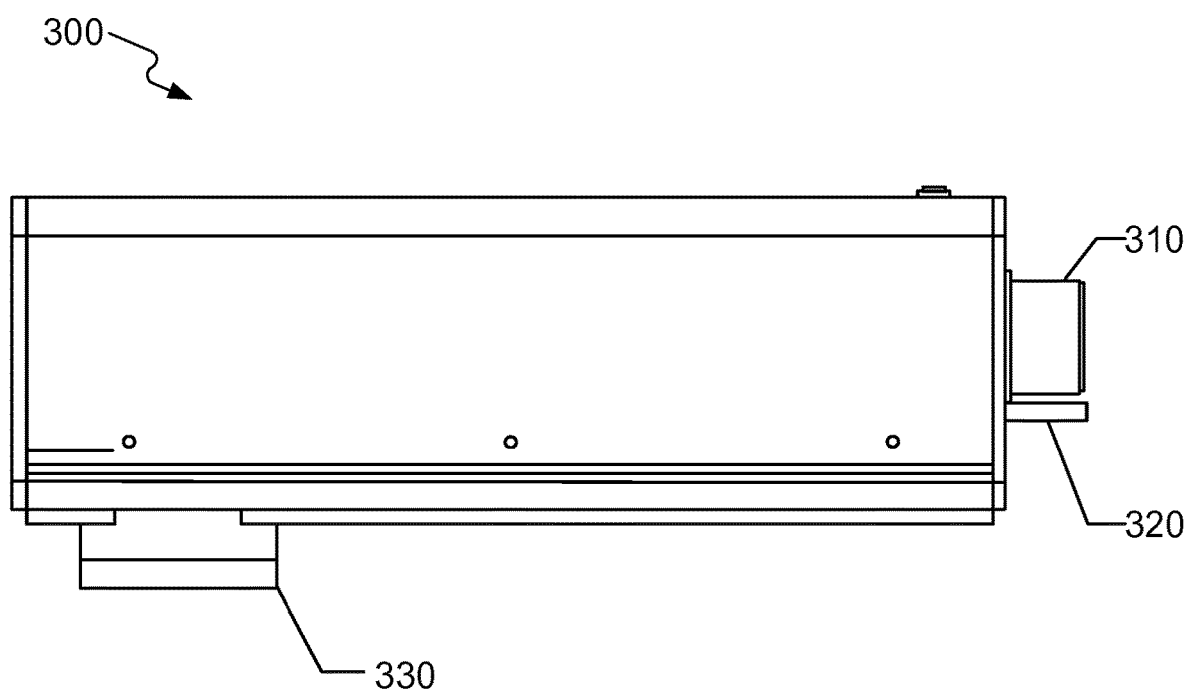
FIG. 3 illustrates an example of a laser head component of a laser marking device.

FIG. 3 illustrates an example laser head 300 component of the laser marking device of the embodiments. According to some implementations, the laser head 300 can be employed as a housing for components of a fiber laser, such as the laser optics assembly (shown in FIG. 2). The laser head 300 can channel the fiber laser light pumped into the laser head 300, through the laser optics assembly, for generating a resulting laser beam. Moreover, the laser head 300 can additionally be utilized for focusing and directing a laser beam during the laser marking process. Such fiber lasers that employ similar laser heads include, but are not limited to, fiber laser model SL F200 (20 W) available from Markem-Imaje Corporation of Keene, N.H. As shown, the laser head 300 is connected to an end of a fiber optic cable 310. Furthermore, a laser marking device cable 320 is connected to laser head 300. The laser marking device cable 320 can be employed to provide a communicative coupling of the laser head 300 to a controller module, for example, such as electronics (displayed in FIG. 2). Thus, laser marking device cable 320 can be employed to transmit commands and/or controls to the laser head 300 component. Also, laser head 300 is shown to include a flat field lens 330. The flat field lens 330 can be an optical lens used for focusing a laser beam to one or more positions on a packaging substrate for producing a laser marking.

In some embodiments, a compact design for laser head 300 can be utilized for realizing integration of the laser marking device components with packaging machinery. For instance, the laser head 300 can be 400 mm in length (i.e., 15.75 inches). Therefore, laser head 300 may have a compact design to implement an integrated marking/packaging solution that can be incorporated into the architecture of packaging devices without considerable changes to either the fiber laser or FFS device design, for example. As an example, the laser marking embodiments described can provide a solution employable by complex FFS packaging machines that operate at packaging speeds of 30 pcs/min to 60 pcs/min and using flexible substrates up to 1,000 mm wide. Moreover, the fiber laser implementation can provide an architecture that reduces the size of machinery employed in laser marking techniques, by utilizing a compact laser design that can be substantially smaller (e.g., 50%) than existing laser technologies, such as $CO_2$ lasers. In some implementations, laser marking techniques can be integrated into FFS machine functions so as to produce laser markings prior to applying packaging substrates to seal the packaged products.

Also, the laser marking device can use a single laser head 300 that can be positioned facing the paper layer, or top, of the packaging substrate to indelibly mark the inner foil. In order to produce an ink printing on the bottom a packaging substrate in a similar manner, using typical CIJ techniques for example, the arrangement may require up to four inkjet machines and bi-nozzle components. Thus, some implementations including laser head 300 may provide the cost advantages for requiring less machinery than in comparison with CIJ devices, for example, to achieve similar marking results.

Figure 4A:
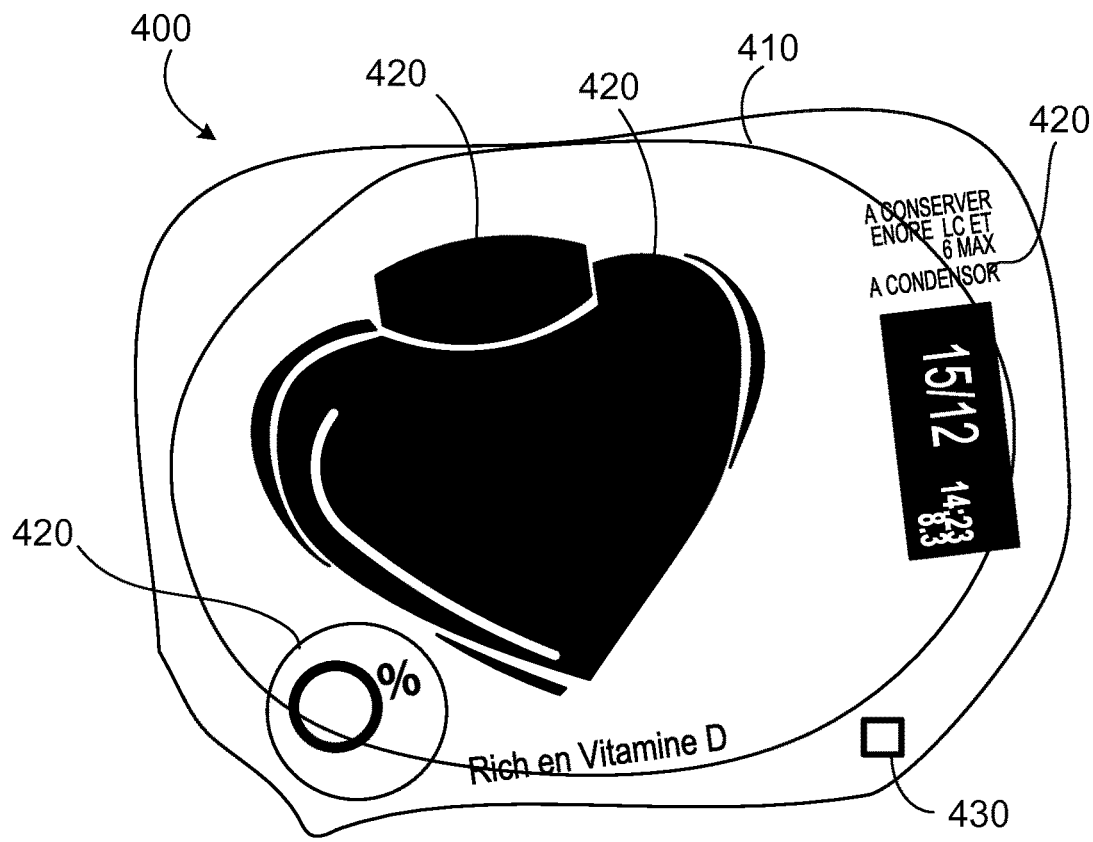
FIGS. 4A-4B illustrate an example of a paper layer side of a packaging substrate.
Figure 4B:
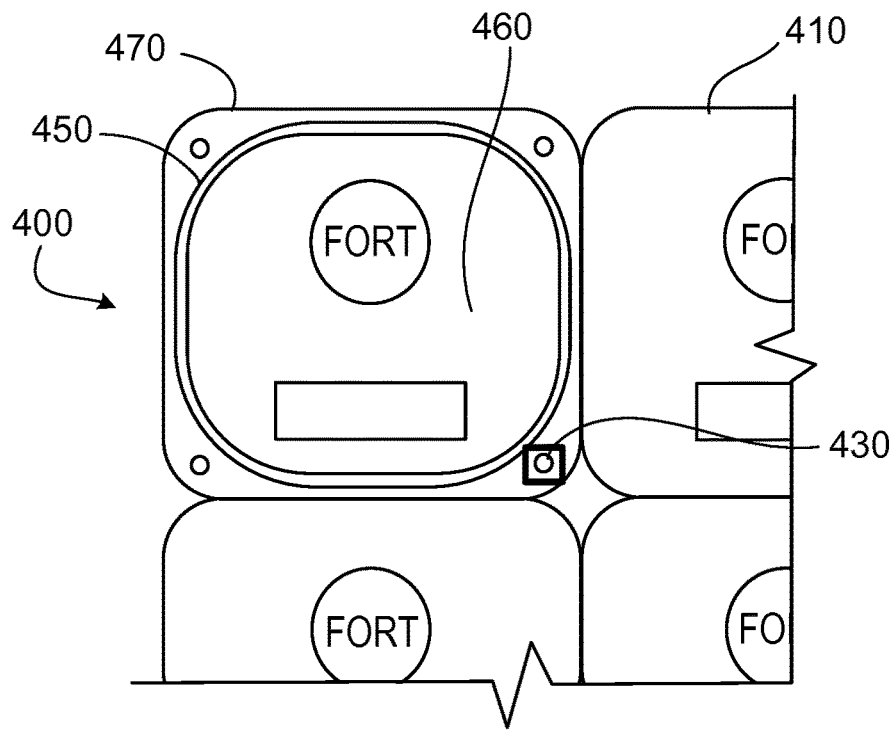

FIGS. 4A-4B illustrate an example of a paper layer 410 side of a packaging substrate 400. The packaging substrate 400 can be a wide web material used for sealing the packaging of a product. In the embodiments, packaging substrate 400 is two-sided, having a top layer made of a non-metal material, such as paper for packaging yogurt as shown in FIG. 4A. The paper layer 410 can be positioned near the upper portion of the packaging, and thereby used to display information intended to be visible to the human eye. For example, paper layer 410 displays product information 420. Opposite the paper layer 410, on the bottom of the packaging substrate 400, is a foil layer (shown in FIG. 5) including a thin sheet of malleable metal, such as aluminum foil. Furthermore, the paper layer 410 can be an outside film of the packaging substrate 400 that does not come into contact with the contents of the product. Accordingly, the product information 420 can include ink printings of various text, graphics, and colors. In some embodiments, the paper layer 410 has been printed on, or otherwise marked, using CIJ mechanisms involving food grade inks Therefore, the packaging substrate 400 can also include a thin layer of ink on the paper layer side 410. For example, a Mixpap packaging substrate can be typically structured to include an ink layer of 0.1 µm, a paper layer of 45 g, a polyethylene terephthalate (PET) layer of 12 µm, and a metallization layer of 2 µm.

In an embodiment, a marking area 430 on the packaging substrate 400 can be employed. The marking area 430 can be a defined region, or portion, of a packaging substrate 400 where a laser beam is directed to generate the laser marking on the inner foil. The product information 420 displayed on the paper layer 410 can be information related to retail, dietary, marketing, or recognition of a product to a consumer, for instance. Thus, it may be important for the information intended for a consumer that is presented on the paper layer 410 to remain legibly and visibly intact. It can be desirable to appropriately position the laser marking in an area that does not interfere with locations of the packaging substrate 400 corresponding to product information 420. Accordingly, marking area 430 can be determined based on one or more printing considerations including, but not limited to, the absorption rate of inks on the paper layer, the color of the inks on the paper layer, and the depth of the ink layers on the paper layer. Alternatively, the position for marking area 430 can be selected by identifying a clear (e.g., white, yellow, no color, and no ink layer) zone of the paper layer 410. According to the embodiment, possible ablation of any graphics may be minimized or avoided in employing a clear zone to establish marking area 430. In some implementations, the packaging color around a print image, or the specified marking area 430, can be changed on the paper layer 410 side so as to reduce, or otherwise hide, any residual effects of the laser marking, such as color darkening, indentations, ablation, or the like.

In some implementations, a rectangle can be projected onto the packaging substrate 400 to indicate the marking area 430. Thus, the projection serves as an aiming indication for the laser beam where the one or more symbols of the marking will be formed within the determined marking area 430. During operation of the laser marking system, the marking area 430 can be formed on the packaging substrate 400, for example. A user interface can then be used to activate marking within the marking area 430. Thus, the operator of the laser marking system can select where the laser beam prints on the packaging substrate 400 by ensuring that the marking area 430 appears in the desired location for the laser marking. Other suitable marking area marks include, but are not limited to, marks at the four corners of a marking area, a mark positioned in the center of the marking area, and a dashed line around the marking area.

Additionally, the electronics of the laser marking system can be designed to control the size and geometry of the marking area 430. As a result, the electronics can match the size and shape of the symbols included in the laser marking to be printed on the packaging substrate. For example, when an unusually large code is to be printed on the foil layer, the electronics can enlarge the marking area so the code will be formed entirely within the marking area. As a result, an increase in the size of the code will not result in erroneous positioning of the code on the packaging, for example.

FIG. 4B displays another example of the paper layer 410 side of a packaging substrate 400. In some embodiments, the packaging machinery employs a product matrix, where a specified number of packages can be simultaneously manipulated (e.g., filled, sealed, marked, etc.) during the packaging process. FIG. 4B illustrates a 2×2 product matrix of a packaged food product, namely yogurt. As shown in FIG. 4B, each respective packaging cup has a top layer that is equally sized (e.g., 63 mm$^2$), and correspondingly creates a standard product matrix size (e.g., 126 mm$^2$). In some embodiments, the laser marking system can be appropriately configured, or otherwise tailored, for use with specific packaging settings, such as a product matrix size. As an example, the laser marking device can be configured to cover a print area spanning 100 mm$^2$ when set at a focal distance of 160 mm. Consequently, a laser marking device configured to the particular focal distance (e.g., 160 mm) can adequately cover the marking area needed for a 2×2 product matrix. In some embodiments, packaging machinery can be programmed to employ one or more different product matrix sizes. For instance, 3×3 and 4×4 matrices for yogurt packages can be employed by a FFS machine during the packaging process. Thus, using corresponding focal distance settings of 254 mm (print area 160 mm$^2$) and 420 mm (print area 242 mm$^2$) respectively, properly configures a laser marking device to cover the area needed for laser marking in each packaging arrangement. It should be appreciated that other laser marking settings can be adjusted so as to accommodate a specific packaging application and/or machinery.

Furthermore, FIG. 4B illustrates a sealing area 450 associated with the packaging substrate 400. The seal area 450 can be a zone, or boarder, including a package sealing. As shown in FIG. 4B, the seal area 450 surrounds a middle portion 460 of the paper layer 410 that is positioned inside of the seal area 450. In some embodiments, the middle portion 460 can be an area of the packaging substrate 400 that directly covers the product. The inner foil side corresponding to the middle portion 460 can come directly into contact with the food product inside of the packaging. Additionally, the seal area 450 leaves a portion of the packaging substrate 400 outside of the area, shown in FIG. 4B as exterior corner 470.

In an example, heat can be applied to sections of packaging substrate 400 in order to seal the layer materials to a rim of the packaging, thereby outlining the seal area 450. Therefore, points along the seal area 450 can indicate a location coupling both layers of the packaging substrate 400 to a product package. In some implementations, the sealing capabilities of FFS packaging machines are employed to create the seal area 450 after filling the packaging with contents, like yogurt for example. In some implementations, the marking area 430 location can be associated with the sealing area 450. For instance, the marking area 430 can be a portion of the paper layer 410 that is located outside of the sealing area 450, such as an exterior corner 470. Thus, marking area 430 is situated on the perimeter of the packaging away from the areas that directly cover, or touch, the packaging contents. Accordingly, this implementation may realize a laser marking technique that does not impact quality of the packaged food, by decreasing the potential of any contaminants, such as foil debris, for example, from contacting the product. Moreover, it may be appreciated that further advantages can be provided by implementing the generation of a laser marking outside of a product sealing area 450, such as increased product integrity, reduced pollution risk, reduced residue and/or dust creation, and less chemical contact.

Figure 5:
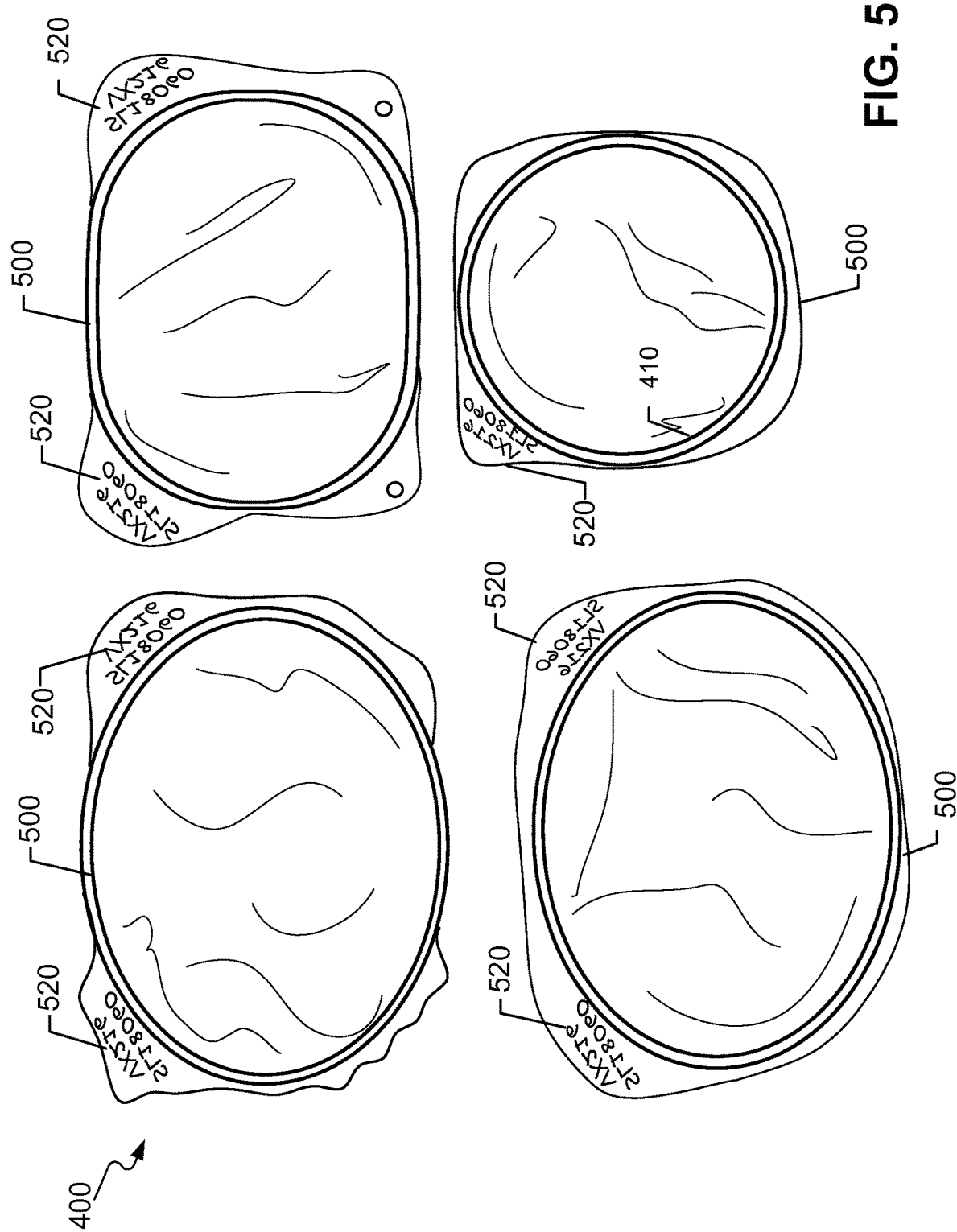
FIG. 5 illustrates an example of a foil layer side of a packaging substrate.

FIG. 5 illustrates examples of a foil layer 500 side of a packaging substrate 400. As shown in FIG. 5, there are four examples of a foil layer 500 side of a packaging. Each example of a foil layer 500 has a different geometric shape, size, and dimension that can be associated with the respective packaging used for various products. In the embodiments, the packaging substrate 400 has an inner, or bottom, layer that is located on a side opposite of the top paper layer (shown in FIGS. 4A-4B). The inside layer of packaging substrate 400 is a foil layer 500 side including a layer of metal material. In some embodiments, the foil layer 500 can be a thin sheet of malleable metal suitable for packaging, such as aluminum foil. Vacuum metallization can be employed to implement a foil layer 500, thereby creating a thinly layered side of the packaging substrate 400, for example having a depth of less than 1 μm in some embodiments. It should be appreciated that some packaging substrates can employ foil designs using a comparatively thinner layer of metallization (e.g., 2 μm to 0.2 μm) than shown in FIG. 5, so as to reduce packaging costs or shorten the shelf life of the packaged product, for instance. In some implementations, a dedicated metal, for example aluminum, can be used to construct the foil layer 500 side. Alternatively, the foil layer 500 can include metal alloy materials.

Different materials used to construct either side of the packaging substrate 400 can cause changes in absorption rates between the top and bottom layers of a packaging substrate 400. Materials such as paper and thin-film optically transparent polymers may not absorb enough of a laser beam generated at near IR wavelengths from a fiber laser, for example, to generate markings on the surface of the material that are visible to the unaided human eye. In contrast, near IR wavelength laser beams can be absorbed well by metals. Thus, the top layer of the substrate can have an absorption rate associated with a paper material, while the bottom layer of the packaging substrate 400 can have another absorption rate related to metal. The absorption rates for each side of the substrate 400 can be separate and distinct from each other, which effectuates a change in a laser beam behavior as it contacts each layer respectively. Therefore, the laser marking embodiments leverage the absorption properties of packaging materials (e.g., paper and foil) to generate a laser beam having the properties to effectuate the behavior of effectively passing through a non-metal layer, and being absorbed by the metal layer to generate a laser marking on the bottom surface of the marking substrate 400.

In the embodiments, a fiber laser, for example, can be employed to produce a laser marking 520 on the foil layer 500 side. As illustrated in FIG. 5, each example of a foil layer 500 side includes at least one laser marking 520. The laser marking 520, in some embodiments, can be a discreet code, such as a serial number, used for tracking products and anti-counterfeiting. Thus, the laser marking 520 can be information that is used for company internal purposes (e.g., traceability and verification) and accordingly does not need to be readily visible to a consumer, for example. A laser marking on the underside of a product may realize a discreet coding that does not take away from the marketing look and feel of the product. Laser markings are produced in a manner where codes can be hidden from users on the inner foil layer 500 side, creating a discreet code solutions.

Figure 6A:
FIGS. 6A-6B illustrate examples of laser markings on a substrate as generated by a laser marking device.
Figure 6B:

FIGS. 6A-6B illustrate examples of laser markings generated by a laser marking device of the embodiments. Shown in FIG. 6A is an example of a laser marking 600 generated using a mirror font. The laser marking 600 can be formed by using a font that involves writing, or otherwise marking, alphanumeric characters in a direction that is the reverse of the natural way for a given language (e.g., left to right). Therefore, employing a mirror font for generating laser marking 600 can result in the mirror image of normal writing, as illustrated in FIG. 6A. As an example, the laser marking 600 appears as "ABCDE" when it is reflected in a mirror, or read from the underside of a packaging substrate in accordance with the embodiments.

As shown in FIG. 6B, the laser markings 605 and 610 are examples of markings generated by a laser marking device of the embodiments. As an example, in an instance when mirror font is selected for producing a laser making, the mirror image characters can be selected and ordered for marking starting from the end of the entered alphanumeric string rather than from the beginning A laser marking 610 is generated in a mirrored font, so as to present characters normally to the user on an underside, or foil layer side, of the packaging. In the implementations, the laser marking device is arranged to face a top layer of the packaging substrate, and cause the laser beam to produce the laser marking on the opposing side. Thus, a laser marking 605 can be generated using typically arranged font, thereby causing the marking to appear mirrored on the opposite side (e.g., foil layer), as shown.

In some embodiments, the laser markings 605, 610 are generated in an arc shape. For example, the characters included in an alphanumeric string are aligned to form text written in the shape of a curve. Laser markings 605, 610 generated in an arc font can be formed by starting from a baseline and using a slightly angled position for each subsequent character, relative to each other, in a manner that follows part of the circumference of a circle. In some implementations, the center of the arc can be the center of the entered alphanumeric string. Using an arching, or radial, arrangement of characters for marking the laser markings 605, 610 can create more unobtrusive codes, by using less area of the packaging. Moreover, the marking size itself can be decreased, in some implementations, For example, laser marking 605 has a smaller radius and font size than marking 610. Additionally, the laser markings 605, 610 can be printed in any suitable character arrangement, such as linear, slanted, horizontal, vertical, and the like. The laser markings 605, 610 located on the bottom layer of the packaging substrate can be read by flipping the package upside down, for instance. The laser markings 605,610 can be indelibly marked in the inner foil of a packaging substrate. In some implementations, the laser markings 605,610 may realize greater product integrity as compared to CU printing techniques, where printed marks may smear or otherwise be removed.

Moreover, in some implementations, an operator of the laser marking system can use the user interface to select the size and shape of the pixels used in creating laser markings 605,610. The time required to form a spot is generally a function of the components of the material.

The distance between the spots and/or pixels used in creating laser markings 605,610 can be adjusted to increase or decrease the size and/or density of the symbol. In some instances, the distance between the pixels is reduced to the point that the perimeter of one pixel abuts the perimeter of another pixel. When the pixel perimeters abut one another, a code and/or an image being printed can have a solid and continuous appearance.

The size of the pixels formed by the laser marking system can be adjusted by increasing the number of spots used to create the pixel and/or by decreasing the density of spots while keeping the number of spots the same. When faster printing is needed, the total number of spots used to make up the symbol can be decreased, such as by decreasing the density of spots used to make up a symbol of a given size. This adjustment capability can also be made available to the operator of the laser marking system through the user interface. Moreover, the printing system electronics can be configured to select a mode of operation based on a density of the spots in the code.

The electronics can include components that facilitate input of symbols included in laser markings 605,610. The electronics can include a database that associates alphanumeric symbols with particular pixel patterns. As a result, the operator can enter a symbol or symbol sequence into the user interface, and the laser marking system consults the database to determine the pixel pattern associated with each symbol. The electronics can also include an input interface for barcode information and image information. Additionally, the electronics can include information for two dimensional (2D) barcodes, such as Quick Response (QR) code. Moreover, mirroring font, as previously described, can be applied to barcode information and image information. For example, a software application can be used to enter 2D barcode information, which can be converted into a set of character information in a font specified for 2D barcode printing. Such character information can be communicated to the laser marking device, which can include electronics that recognize the font and can thus convert the character information into the pixel pattern (e.g., each "character" in the recognized font can correspond to a vertical set of elements in the 2D bar code). The software application can also be used to enter a graphic image, which can be converted into the pixel pattern for printing, by filling dark areas of the image to be marked with concentric outlines of pixels (e.g., single spot pixels), starting at the perimeter and moving in to the center of the image until all dark areas are filled.

The pixel pattern of each symbol is used in laser markings 605, 610 to form a first data set which indicates the position of each pixel. For instance, each pixel can be associated with a Cartesian coordinate, which indicates where the pixels are to be printed relative to one another. Other coordinate systems and methods can also be used to control the relative positioning of the pixels in a symbol.

Figure 7:
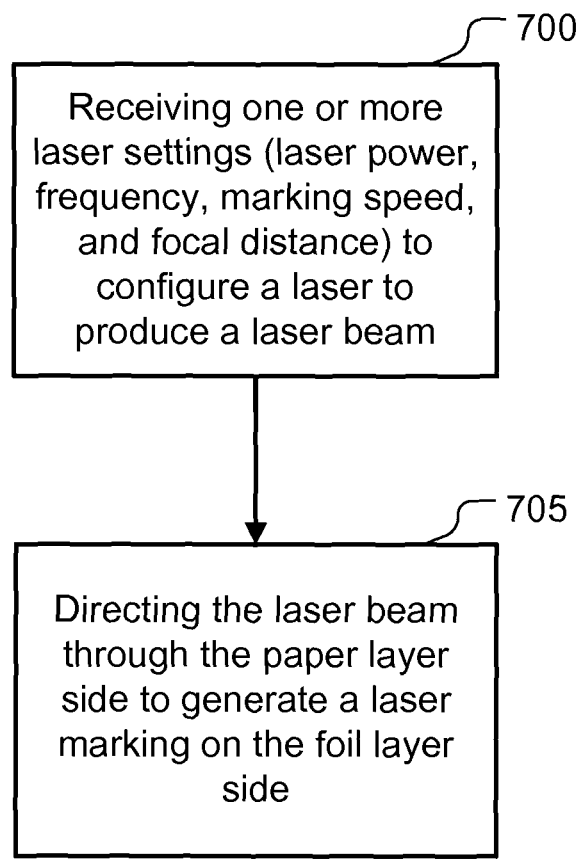
FIG. 7 illustrates an example of a process for generating a laser marking on a packaging substrate.

FIG. 7 illustrates an example process for generating a laser marking on a packaging substrate. The described technique for marking the inner foil of the packaging substrate can be performed by the laser marking system components, as discussed relating to FIG. 2, for example. One or more laser settings used to configure a laser are received 700. The settings can be associated with an optimized configuration for a fiber laser, for instance, to produce a laser beam having the characteristics necessary to achieve marking of a packaging substrate in accordance with the embodiments. Configuring a laser according to one or more settings can include adjusting the various components of the laser marking system to operate in a manner consistent with the desired settings. For example, a laser lens can be automatically repositioned so as to achieve the desired focal distance indicated in the settings. In an example, a laser can be configured for producing a laser beam having a wavelength of 1.06 μm. Therefore, a resulting laser beam can pass through the paper layer of the marking substrate, while being absorbed by the foil layer. Setting the laser configuration can involve a user interface of the laser marking system that is designed to receive input from a user in order to receive the one or more settings. Alternatively, the laser settings can be predetermined and programmed into a component of the laser marking system, for example the electronics (shown in FIG. 2).

In some implementations, the laser settings include specified parameters indicating the functional settings for power, frequency, marking speed, focal distance, and resolution, for example, corresponding to an operating mode of the laser marking device. In addition, the one or more settings can include any portion of the aforementioned parameters, or any combination thereof. As an example, the received settings corresponding to a configuration for a laser marking device to mark a paper/foil packaging substrate can include: laser power setting between 30% and 60%; a frequency setting between 25 KHz and 50 KHz; a marking speed setting of approximately 4,800 mm/s; a focal distance setting between 160 mm-480 mm; and a resolution setting at 10 pts/mm. Additionally, the laser settings can include a resolution range so as to affect the code quality and energy that is delivered to the packaging substrate. For instance, a resolution range setting between 8 mm/s and 12 mm/s can be employed to configure the laser marking device, and thus produce laser markings that include respective character sizes (e.g., between 1 mm and 4 mm). Therefore, utilizing various laser settings can implement multiple configurations of the laser marking system. The respective configurations can be adjusted in a manner that customizes the operation of the laser marking system for the desired application, such as employing an increased laser power setting to cover a larger marking area and/or mark multiple products simultaneously (e.g., as a FFS product line is stopped or moving at low speeds).

Thereafter, the produced laser beam is directed 705 through the paper layer side of a packaging substrate, so as to avoid leaving a legible mark on the paper layer. In some implementations, a laser head is positioned facing the paper layer, thereby directing, or otherwise, focusing the laser beam towards that top layer of the packaging substrate. The laser beam generates a marking on the bottom foil layer side of the packaging substrate. The directed laser beam, being generated at near IR wavelength based on the received laser settings, can be effectively absorbed by the foil material to generate a mark. Generating a laser marking can involve using various marking techniques achievable via fiber lasers including annealing, for example. The laser marking can include code information, such as a serialized code that is easily visible since the human eye can pick up the sections having darker, engraved, or removed areas.

The functional operations described in this specification can be implemented in digital electronic circuitry, or in computer hardware, firmware, software, or in combinations of them, such as the structural means disclosed in this specification and structural equivalents thereof. The described processing operations can be performed by a programmable processor executing a program of instructions to perform functions by operating on input data and generating output. Suitable processors include, by way of example, both general and special purpose microprocessors. Generally, a processor will receive instructions and data from a read-only memory, a random access memory and/or a machine-readable signal (e.g., a digital signal received through a network connection). Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and optical disks, such as CD-ROM disks. Any of the foregoing can be supplemented by, or incorporated in, ASICs.

To provide for interaction with a user, the systems and techniques described can be implemented on a data processing system having a display device such as a monitor or LCD (liquid crystal display) screen for displaying information to the user and a keyboard and a pointing device such as a mouse or a trackball by which the user can provide input to the computer system. The data processing system can be programmed to provide a graphical user interface through which programs interact with users.

Various embodiments have been described above. Other embodiments are within the scope of the following claims.

What is claimed is:

1. An apparatus comprising:
  a fiber laser operable to produce a laser beam, wherein the laser beam is produced at a wavelength of 1.06 μm;
  an optics assembly operable to focus and direct the laser beam onto a non-metalized layer side of a substrate, wherein the substrate comprises the non-metalized layer side comprising a non-metalized material and a metalized layer side comprising a metalized material, the metalized layer side being opposite the non-metalized layer side; and
  electronics communicatively coupled with the fiber laser and the optics assembly, the electronics being operable to control the fiber laser and the optics assembly, based on one or more laser settings, to (i) direct the laser beam through the non-metalized layer side to be absorbed by the metalized layer side, (ii) generate a laser marking on the metalized material, and (iii) avoid generating the laser marking on the non-metalized material;
  wherein the electronics are further operable to direct the laser beam to a determined marking area portion of the metalized layer side, after the substrate is already attached to seal a product packaging, wherein the marking area portion is positioned outside of a sealing portion of the substrate used to seal the product packaging, and wherein the marking area portion is determined based on an absorption rate of one or more inks associated with a corresponding portion of the non-metalized layer side to avoid generating the laser marking on the non-metalized material;

wherein the one or more laser settings comprise a laser power setting, a frequency setting, a marking speed setting, and a focal distance setting; and wherein the marking area portion is determined based on the absorption rate of at least one color of the one or more inks.

2. The apparatus of claim 1, wherein the non-metalized material comprises paper and the metalized material comprises aluminum foil.

3. The apparatus of claim 1, wherein the laser power setting is between 30% and 60% of a predefined laser power, the frequency setting is between 25 kHz and 50 kHz, the marking speed setting is 4800 mm/s, and the focal distance setting is 160 mm.

4. The apparatus of claim 1, wherein the at least one color of the one or more inks are adjusted to avoid generating the laser marking on the non-metalized material.

5. The apparatus of claim 1, wherein the marking area portion is determined based on an absorption rate of an ink layer depth of the one or more inks.

6. The apparatus of claim 1, wherein the laser marking comprises one or more characters in a mirror font to be legible on the metalized layer side.

7. A system comprising the apparatus of claim 1 and one or more devices operable to package a product.

8. The system of claim 7, wherein the laser comprises a 400 mm compact head and is physically coupled to the one or more devices.

9. A method comprising:

receiving one or more laser settings, wherein the one or more laser settings are determined to configure a fiber laser to produce a laser beam having a wavelength of 1.06 μm that is absorbed by a foil layer side of a substrate and substantially not absorbed by a paper layer side of the substrate, wherein the substrate comprises the foil layer side and the paper layer side opposite the foil layer side; and directing, based on the one or more laser settings, the laser beam through the paper layer side to generate a laser marking on the foil layer side and avoid generating the laser marking on the paper layer side using the laser beam, the directing being to a determined marking area portion of the foil layer side, after the substrate is already attached to seal a product packaging, wherein the marking area portion is positioned outside of a sealing portion of the substrate used to seal the product packaging, and wherein the marking area portion is determined based on an absorption rate of one or more inks associated with a corresponding portion of the paper layer side to avoid generating the laser marking on the paper layer side;

wherein the one or more laser settings comprise a laser power setting, a frequency setting, a marking speed setting, and a focal distance setting; and wherein the marking area portion is determined based on the absorption rate of at least one color of the one or more inks.

10. The method of claim 9, wherein receiving the one or more laser settings comprises receiving the laser power setting being between 30% and 60% of a predefined laser power, the frequency setting being between 25 kHz and 50 kHz, the marking speed setting being 4800 mm/s, and the focal distance setting being 160 mm.

11. The method of claim 9, comprising adjusting the at least one color of the one or more inks to avoid generating the laser marking on the non-metalized material.

12. The method of claim 9, comprising determining the marking area portion based on an absorption rate of an ink layer depth of the one or more inks.

* * * * *